(12) United States Patent
Janson et al.

(10) Patent No.: US 6,880,418 B2
(45) Date of Patent: Apr. 19, 2005

(54) METHOD FOR CONTROLLING SPEED RATIO CHANGES IN A LAYSHAFT AUTOMATIC TRANSMISSION HAVING POWER-ON SHIFTING

(75) Inventors: David Allen Janson, Plymouth, MI (US); Reid Alan Baldwin, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 35 days.

(21) Appl. No.: 10/606,102

(22) Filed: Jun. 25, 2003

(65) Prior Publication Data

US 2004/0266584 A1 Dec. 30, 2004

(51) Int. Cl.[7] ............................................... F16H 3/097
(52) U.S. Cl. ........................ 74/331; 74/336 R; 74/339
(58) Field of Search ........................... 74/331, 339, 340, 74/335, 336 R, 664

(56) References Cited

U.S. PATENT DOCUMENTS

| | | | |
|---|---|---|---|
| 4,463,621 A | * | 8/1984 | Fisher ............................ 74/331 |
| 4,594,908 A | * | 6/1986 | Akashi et al. ................. 74/331 |
| 4,876,907 A | * | 10/1989 | Andersson et al. ............ 74/339 |
| 5,711,409 A | | 1/1998 | Murata ....................... 192/87.11 |
| 5,720,203 A | | 2/1998 | Honda et al. .................. 74/325 |
| 5,890,392 A | | 4/1999 | Ludanek et al. .............. 74/331 |
| 5,915,512 A | | 6/1999 | Adamis et al. ............. 192/3.61 |
| 5,950,781 A | | 9/1999 | Adamis et al. ............. 192/3.61 |
| 6,044,719 A | | 4/2000 | Reed, Jr. et al. .............. 74/330 |
| 6,186,029 B1 | * | 2/2001 | McQuinn ...................... 74/331 |
| 6,397,692 B1 | | 6/2002 | Carriere ....................... 74/331 |
| 6,427,550 B1 | | 8/2002 | Bowen ..................... 74/336 R |

\* cited by examiner

*Primary Examiner*—Sherry Estremsky
(74) *Attorney, Agent, or Firm*—David B. Kelley

(57) ABSTRACT

A method for operating a power transmission to produce gear ratio changes includes driveably connecting the transmission input and output in the off-going gear through a friction clutch and primary power path, establishing a potential drive connection between the input and output through a secondary power path, releasing the friction clutch, driveably connecting the input and output through the secondary power path, establishing a potential drive connection between the input and output through the primary power path in the oncoming gear, reapplying the friction clutch, driveably disconnecting the input and output through the secondary power path, and driveably connecting the input and output in the oncoming gear ratio through the friction clutch and primary power path.

23 Claims, 6 Drawing Sheets

| Pinion/Gear | Number of Teeth |
|---|---|
| 60 | 43 |
| 66 | 35 |
| 42 | 29 |
| 46 | 25 |
| 50 | 23 |
| 56 | 43 |
| 58, 62 | 19 |
| 64, 68 | 27 |
| 40 | 33 |
| 44 | 37 |
| 48 | 41 |
| 54 | 19 |
| 52 | 19 |
| 38, 38' | 38 |
| 36 | 27 |
| 26, 26' | 26 |
| 28 | 37 |

Figure 3

| | \| Clutch / Coupler States \| | | | | |
|---|---|---|---|---|---|---|
| | 70 | 82 | 84 | 86 | 22 | 30 |
| Ready for forward launch | Left | Neutral | Neutral | Neutral | Off | - |
| Completion of forward launch | Left | Neutral | Neutral | Neutral | Applied | - |
| 1->2 shift, step 1 | Left | Neutral | Neutral | Left | Applied | O/R |
| 1->2 shift, step 2 | Left | Neutral | Neutral | Left | Off | X |
| 1->2 shift, step 3 | Right | Neutral | Neutral | Left | Off | X |
| 1->2 shift, step 4 | Right | Neutral | Neutral | Left | Applied | O/R |
| 1->2 shift, complete | Right | Neutral | Neutral | Neutral | Applied | - |
| 2->3 shift, step 1 | Right | Neutral | Neutral | Right | Applied | O/R |
| 2->3 shift, step 2 | Right | Neutral | Neutral | Right | Off | X |
| 2->3 shift, step 3 | Neutral | Left | Neutral | Right | Off | X |
| 2->3 shift, step 4 | Neutral | Left | Neutral | Right | Applied | O/R |
| 2->3 shift, complete | Neutral | Left | Neutral | Neutral | Applied | - |

*Figure 3 cont.*

| | Clutch / Coupler States | | | | | |
|---|---|---|---|---|---|---|
| | 70 | 82 | 84 | 86 | 22 | 30 |
| 3->4 shift, step 1 | Neutral | Left | Neutral | Neutral | Off | - |
| 3->4 shift, step 2 | Neutral | Right | Neutral | Neutral | Off | - |
| 3->4 shift, complete | Neutral | Right | Neutral | Neutral | Applied | - |
| 4->5 shift, step 1 | Neutral | Right | Neutral | Neutral | Off | - |
| 4->5 shift, step 2 | Neutral | Neutral | Left | Neutral | Off | - |
| 4->5 shift, complete | Neutral | Neutral | Left | Neutral | Applied | - |
| Ready for reverse launch | Neutral | Neutral | Right | Neutral | Off | - |
| Completion of reverse launch | Neutral | Neutral | Right | Neutral | Applied | - |

|  | Speeds | | | | Torque Ratio |
|---|---|---|---|---|---|
|  | Primary | Secondary | Clutch | Output |  |
| Ready for forward launch | 0.000 | - | 1.000 | 0.000 | 0.000 |
| Completion of forward launch | 0.711 | - | 0.000 | 0.314 | 3.185 |
| 1->2 shift, step 1 | 0.711 | 0.711 | 0.000 | 0.314 | 3.185 |
| 1->2 shift, step 2 | 0.703 | 0.703 | 0.011 | 0.310 | 3.221 |
| 1->2 shift, step 3 | 0.402 | 0.703 | 0.434 | 0.310 | 3.221 |
| 1->2 shift, step 4 | 0.711 | 1.240 | 0.000 | 0.548 | 1.824 |
| 1->2 shift, complete | 0.711 | - | 0.000 | 0.548 | 1.824 |
| 2->3 shift, step 1 | 0.711 | 0.711 | 0.000 | 0.548 | 1.824 |
| 2->3 shift, step 2 | 0.703 | 0.703 | 0.011 | 0.542 | 1.845 |
| 2->3 shift, step 3 | 0.476 | 0.703 | 0.330 | 0.542 | 1.845 |
| 2->3 shift, step 4 | 0.711 | 1.830 | 0.000 | 0.809 | 1.237 |
| 2->3 shift, complete | 0.711 | - | 0.000 | 0.809 | 1.237 |

*Figure 4*

|  | Speeds | | | | Torque Ratio |
| --- | --- | --- | --- | --- | --- |
|  | Primary | Secondary | Clutch | Output | |
| 3->4 shift, step 1 | 0.711 | - | 0.000 | 0.809 | 0.000 |
| 3->4 shift, step 2 | 0.546 | - | 0.231 | 0.809 | 0.000 |
| 3->4 shift, complete | 0.711 | - | 0.000 | 1.052 | 0.951 |
| 4->5 shift, step 1 | 0.711 | - | 0.000 | 1.052 | 0.000 |
| 4->5 shift, step 2 | 0.590 | - | 0.170 | 1.052 | 0.000 |
| 4->5 shift, complete | 0.711 | - | 0.000 | 1.267 | 0.790 |
| Ready for reverse launch | 0.000 | - | 1.000 | 0.000 | 0.000 |
| Completion of reverse launch | 0.711 | - | 0.000 | -0.314 | -3.185 |

*Figure 4 cont.*

METHOD FOR CONTROLLING SPEED RATIO CHANGES IN A LAYSHAFT AUTOMATIC TRANSMISSION HAVING POWER-ON SHIFTING

BACKGROUND OF THE INVENTION

1. Field of the Invention

This invention relates to the field of transmissions having a layshaft kinematic arrangement, particularly to such transmissions in which gear ratio changes occur without interrupting power flow.

2. Description of the Prior Art

Automatic transmissions for motor vehicle generally employ multiple planetary gearsets whose components are continuously engaged. The gearset components are alternately held and released against rotation by brakes, and are connected and disconnected to components of other gearsets by clutches so that gear ratio changes occur without affecting the continuous gear engagements and without interrupting the flow of power among the gearset components.

Typically manual transmissions have a kinematic arrangement in which a countershaft or layshaft and an output shaft each rotatably support a gear or pinion of a pinion-gear pair associated with a particular gear ratio. Although the gear and pinion are continuously engaged, either the pinion or gear is journalled on its shaft. The journalled component is driveably secured to the shaft by a coupler or synchronizer, which mechanically completes the connection usually after coordinating the speed of the shaft and the speed of the associated gear or pinion. This operation requires use of a friction clutch located in the drive path between the engine output and transmission input. The clutch disengages to interrupt power flow to the transmission before beginning a gear ratio change, and re-engages after completing the gear ratio change to restore power flow to the transmission and drive wheels.

Manual transmissions of this type are characterized by a distinctive, perceptible power flow interruption and the potential for harsh speed ratio changes unless the operator employs care and skill while manually operating a clutch pedal and gear selector in coordination with the engine, driven wheels and driving conditions.

Automatic transmissions for transmitting power between an input and output, either over a continuously variable range of speed ratios or in discrete step changes among speed ratios, have associated with them several sources of parasitic losses, which adversely affect fuel economy. These losses are associated with a torque converter, open clutches and brakes, hydraulic pump, and gear meshes.

In order to avoid these parasitic losses and to improve vehicle fuel economy, an automated shift manual (ASM) transmission has been developed that eliminates many of the low operating efficiency components of an automatic transmission, yet it requires no more driver attention or skill to produce smooth gear ratio changes than does a conventional automatic transmission.

An ASM transmission can eliminate or substantially reduce all of the parasitic losses of an automatic transmission except gear mesh losses. An ASM transmission having a layshaft gear arrangement performs gear ratio changes by first interrupting power or torque transmitted from the engine to the transmission, preparing the transmission components associated with the next speed ratio, and then restoring torque. The need in a conventional ASM transmission to interrupt power transmitted from the engine to the transmission input shaft before each gear ratio change can affect the level of harshness, vibration and noise perceptible to a vehicle occupant.

SUMMARY OF THE INVENTION

An ASM transmission operating in accordance with the present invention avoids entirely any interruption of power during gear ratio changes and avoids the inherent shift control difficulties of ASMs. This invention, however, also reduces the magnitude of parasitic losses to the much lower magnitude associated with a conventional ASM.

A transmission for use with the method of this invention includes only one friction clutch for releasably connecting a source of power, such as an engine or motor, and a transmission input. Gear ratio changes are accomplished with the use of couplers, such as synchronizers or dog clutches, which mutually driveably connect components that participate in each speed ratio, produce very little drag loss when engaged, and do not require continuous supply of power to stay engaged.

Power interruption during shifting is avoided by providing alternate torque or power paths, which transmit power between a transmission input and the output during a gear ratio change. A secondary power path bypasses the friction clutch, but contains a one-way clutch. Before starting an upshift from a current or off-going speed ratio to the next or oncoming speed ratio gear, the secondary power path is set for a slightly lower speed ratio than the current gear by engaging synchronizers or dog clutches, thereby causing the one-way clutch to overrun. In order to transfer power to the secondary power path, the friction clutch is released and the secondary power path carries torque through the one-way clutch. Transfer of torque to the secondary power path is essentially a downshift to a speed ratio that is slightly lower than the off-going speed ratio.

While the secondary power path carries torque, the main or primary power path is set similarly for the destination gear of the gearshift by engaging synchronizers or dog clutches. When the friction clutch is reengaged, torque is transferred back to the primary power path causing the one-way clutch to overrun again. Downshifts are accomplished by reversing this sequence of steps.

All the gear ratio changes including the acceleration of the vehicle from a stop or idle condition, usually referred to as launch, use the same friction clutch. The only additional hardware required is a one-way clutch, the gearing, and a coupler on a second layshaft associated with the secondary torque path.

The method of the present invention can be applied to all of the up-shifts of a particular transmission or any number of the up-shifts depending upon the number of secondary torque paths that are provided.

In realizing these advantages, a method for producing a speed ratio change from an off-going speed ratio to an oncoming speed ratio in a transmission includes the steps of establishing a potential drive connection between an input and output through a secondary power path, disengaging a clutch, driveably connecting the input and output through the secondary power path at a speed ratio that is equal to or less than the speed ratio produced by the off-going speed ratio through the primary power path, establishing a potential drive connection between the input and output through the primary power path in the oncoming speed ratio, and re-engaging the clutch.

Upon later disestablishing the potential drive connection between the input and output through the secondary power path, the speed ratio change is completed. The method is applicable both when the oncoming speed ratio is greater than the off-going speed ratio, and when the oncoming speed ratio is less than the off-going speed ratio.

BRIEF DESCRIPTION OF THE DRAWINGS

FIG. 3 is a chart that indicates the state of engagement of a friction clutch and the couplers corresponding to the steps for producing gear ratio changes in a transmission according to the present invention.

FIG. 4 is a chart that shows an example of the resulting speed ratios for various paths and components, a torque ratio and the gear ratio steps corresponding to various operating steps of the chart of FIG. 3.

DESCRIPTION OF THE PREFERRED EMBODIMENT

Figure 1:
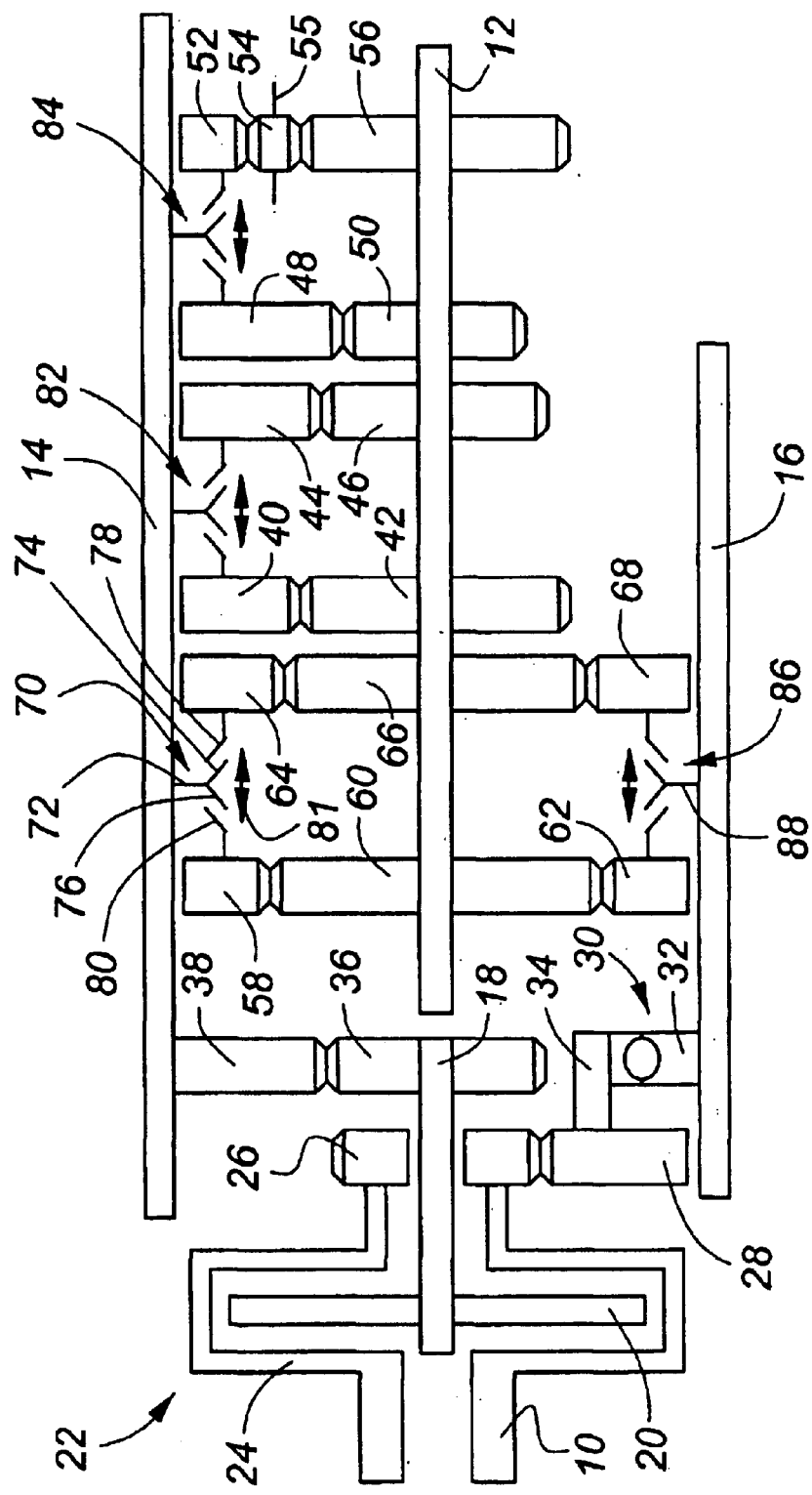
FIG. 1 is a schematic diagram showing the gear arrangement of the transmission according to the present invention.

Referring now to FIG. 1 a transmission according to the present invention includes an input 10 adapted to driveably connect a power source, such as an internal combustion engine or electric motor, and an output 12 for driving a load, such as the driven wheels of a motor vehicle connected through a powertrain that may include a drive shaft, differential mechanism, and axle shafts.

A primary layshaft 14 and secondary layshaft 16, arranged substantially parallel to the output 12, each support pinions that are in continually meshing engagement with gears supported rotatably on the output 12.

A clutched input 18, preferably substantially aligned with output 12, is releasably connected to input 10 through a friction clutch 22, whose output element 20 frictionally engages the clutch's input element 24, which is drivably connected to input 10.

A pinion 26, journalled on member 24 and connected to input 10, is engaged with a gear 28, which is journalled on secondary layshaft 16. A one-way clutch 30, also supported rotatably on layshaft 16, has an inner race 32 fixed to layshaft 16 and an outer race 34 drivably connected to gear 28.

Clutched input 18 supports a pinion 36, which is in continual meshing engagement with gear 38, supported rotatably on primary layshaft 14.

Figures 2, 5:
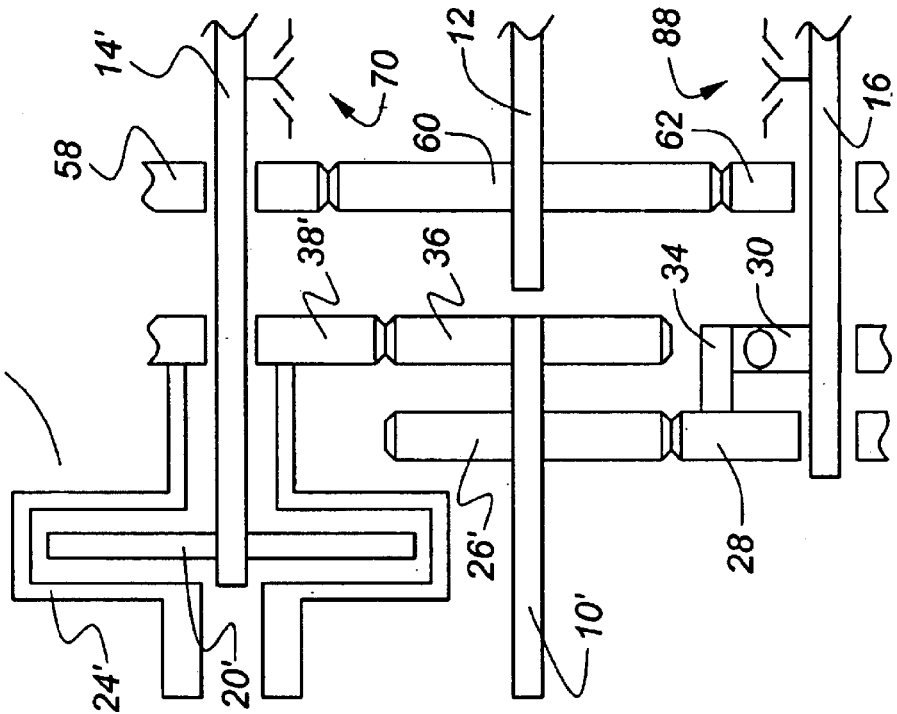
FIG. 2 is a chart containing an example of the number of teeth for each of the gears and pinions shown in FIG. 1.
FIG. 5 is a schematic diagram showing another arrangement of the power path in which the input clutch is located on the first layshaft.

In this way, a primary power path, having a speed ratio that is approximately 0.711 when pinion 36 and gear 38 have the number of teeth specified in FIG. 2, is established between input 10 and layshaft 14. When clutch 22 is engaged, the primary power path causes the speed of layshaft 14 to be approximately 0.711 times the speed of input 10. A secondary power path, having a speed ratio of approximately 0.703 when pinion 26 and gear 28 have the number of teeth specified in FIG. 2, is established between layshaft 16 and input 10. Clutch 30 drivably connects gear 28 and layshaft 16 when input 10 drives layshaft 16, and clutch 30 overruns when the speed of layshaft 16 exceeds the speed of gear 28. When clutch 30 is driving, the secondary power path causes the speed of layshaft 16 to be approximately 0.703 times the speed of input 10.

Spaced axially along output 12 are gear elements of pinion-gear pairs, each member of a pair in continuous meshing engagement with the other member of the pair, and each pair being associated with a particular speed ratio. For example, pinion 40, which is journalled on layshaft 14, is in continuous meshing engagement with gear 42, which is rotatably supported on output 12. Pinion 40 and gear 42 are associated with the third forward speed ratio. Pinion 44, journalled on layshaft 14, is in continuous meshing engagement with gear 46, rotatably supported on output 12. Pinion 44 and gear 46 are associated with the fourth forward speed ratio. Pinion 48, journalled on layshaft 14, is in continuous meshing engagement with gear 50, rotatably supported on output 12. Pinion 48 and gear 50 are associated with the fifth forward gear ratio.

Reverse pinion 52, journalled on layshaft 14, is in continuous meshing engagement with reverse idler 54, supported rotatably on an idler shaft 55. Reverse output gear 56, which is rotatably supported on output 12, is in continuous meshing engagement with reverse idler 54. Pinion 52, idler 54 and gear 56 are associated with the reverse gear ratio.

Also spaced along the axis of output 12 are triplets comprising two pinions, one of each pinion being supported on layshaft 14 and the other on layshaft 16, and a gear supported on and fixed to output 12. For example, pinion 58, which is journalled on layshaft 14, is in continuous meshing engagement with gear 60, supported on output 12. Pinion 62, which is journalled on layshaft 16, is also in continuous meshing engagement with gear 60. Pinion 58, gear 60 and pinion 62 form a triplet that is associated with the first forward gear ratio.

Pinion 64, journalled on layshaft 14, is in continuous meshing engagement with gear 66, supported on output 12. Pinion 68, which is journalled on layshaft 16, is in continuous meshing engagement with output gear 66. Pinion 64, gear 66 and pinion 68 form a triplet that is associated with the second forward gear ratio.

Couplers 70, 82, 84 and 86, are preferably synchronizers of the type used in manual automotive transmissions to connect releasably a gear or pinion to a shaft after first synchronizing the speed of the shaft and that of the pinion or gear. A coupler may also be disengaged from any pinion or gear. An example of such a synchronizer is disclosed in U.S. Pat. No. 4,222,281. Alternatively the couplers may be a toothed clutch having dogteeth that are engaged with clutch teeth on a gear or pinion. This invention may use couplers in any combination of synchronizers and dog clutches.

Each coupler, for example coupler 70, is fixed by a hub 72 on a layshaft 14 for rotation at the speed of that layshaft. In the case where a coupler is a synchronizer, it will be provided with a conical surface 74, 76, which engages mutually with a corresponding conical surface 78, 80, respectively, on the pinions located adjacent the synchronizer. When these conical surfaces are forced together into frictional contact, that engagement synchronizes the speed of layshaft 14 to that of the pinion being engaged and drivably connected through the synchronizer to layshaft 14. Generally the synchronizer is equipped with a sleeve 81 supported on the hub 72 for sliding movement leftward and rightward into engagement with dogteeth carried on the pinion. When the dogteeth of the sleeve engage those of the pinion, the pinion is connected to the layshaft.

The hubs of couplers 82, 84 are rotatably secured to shaft 14; the hub 88 of coupler 86 is rotatably secured to layshaft 16.

In the case where the coupler 70 is a clutch, movement of the sleeve 81 causes mutual engagement of dog teeth formed on the sleeve and dog teeth carried on the pinions so that a drive connection is made between the pinion and the layshaft, but without first synchronizing the speed of the layshaft and the pinion.

A coupler 82, located between pinions 40 and 44, releasably connects alternately those pinions and layshaft 14, and coupler 82 may be disengaged from both pinions. Coupler 84, located between pinions 48 and 52, selectively, alternately produces a drive connection between layshaft 14 and the selected pinion, and coupler 84 may be disengaged from both pinions. Another coupler 86 includes a hub 88 driveably connected and supported for rotation on the secondary layshaft 16. Coupler 86 is located between pinions 62 and 68 in order to selectively produce a drive connection between layshaft 16 and those pinions.

In FIG. 1 the couplers 70, 82, 84, 86 are shown in a neutral position, between the left-hand and right-hand extremities of travel of the connecting element or sleeve, whose engagement with the dog teeth carried on the pinions completes the drive connection of the pinion and associated layshaft.

Referring now to FIG. 3, operation of the transmission will be discussed with reference to the positional states of the couplers and the applied or released condition of clutch 22. The transmission is prepared for forward acceleration of the vehicle from rest in the first gear ratio when the engagement sleeve 81 of coupler 70 is moved leftward, the other couplers 82, 84 and 86 are in the neutral position, and clutch 22 is disengaged. The power source continually drives input 10 and pinion 26 at the speed of the power source; gear 28 is driven by pinion 26 at the speed ratio of the secondary power path, i.e., 0.703 times the speed of input 10, provided the gears and pinions have the sizes of the example of FIG. 2. However, since coupler 86 is in the neutral position, no power is transferred to output 12, and the speed of output 12 is zero. Next, clutch 22 is applied, either manually by the vehicle operator's manipulation of a clutch pedal, lever or button, or automatically in response to a signal produced by a transmission electronic control system. When clutch 22 is engaged, primary layshaft 14 is driven through clutch 22, input 18, pinion 36, and gear 38 at the speed ratio of the primary power path, i.e., 0.711 times the speed of input 10. Output 12 is driven from layshaft 14 through coupler 70, pinion 58 and gear 60, which is drivably fixed to output 12. These actions complete the engagement of the first forward speed ratio, whereby the output 12 is driven at a speed ratio of 0.314.

An upshift from the first to the second speed ratio is accomplished in a series of steps that begins by moving the engagement element or sleeve of coupler 86 leftward to drivably connect pinion 62 and the secondary layshaft 16. This action causes one-way clutch 30 to overrun or permits it to continue to overrun. Then clutch 22 is released, thereby causing one-way clutch 30 to driveably connect layshaft 16 and gear 28, which drives output 12 through gear 60 at a speed ratio of 0.310, a slight downshift from the first gear ratio, 0.314. Next, the engagement element or sleeve of coupler 70 is moved from the left-hand to the right-hand position, thereby drivably connecting pinion 64 and layshaft 14. Output 12 remains driven through the secondary power path at a speed ratio of 0.310. Clutch 22 is then applied, causing one-way clutch 30 to overrun, and driving output 12 through the primary power path: pinion 36, gear 38 and layshaft 14, which drives second speed pinion 64 and second speed gear 66. Moving the sleeve of coupler 86 to the neutral position, i.e., out of engagement with pinion 62 completes the upshift to the second speed ratio from the first speed ratio. Output 12 is driven at a speed ratio of 0.548.

The torque delivery path in the second forward speed ratio includes input 10, clutch 22, input 18, gear 36, pinion 38, layshaft 14, coupler 70, pinion 64, gear 66, and output 12.

An upshift from a second speed ratio to the third speed ratio is similarly accomplished in a series of steps that begins by moving the selection sleeve of coupler 86 to the right-hand position from the neutral position, thereby driveably connecting pinion 68, gear 66, and output 12 through coupler 86, and layshaft 16. With the transmission components so disposed, one-way clutch 30 overruns, and the output remains driven through the primary power path at the 0.548 speed ratio. Then clutch 22 is released, which causes clutch 30 to produce a drive connection between layshaft 16 and gear 28. The output 12 is driven through the secondary power path, pinion 68 and gear 66 at a slightly reduced speed ratio of 0.542. Next, the selector sleeve of coupler 70 is moved to the neutral position and the selector sleeve of coupler 82 is moved to the left-hand position, thereby drivably connecting layshaft 14 and pinion 40. The output remains driven through the secondary power path at the 0.542 speed ratio. Then clutch 22 is reapplied, which action causes one-way clutch 30 to overrun and output 12 to be driven again through the primary power path, pinion 40 and gear 42 at the third forward speed ratio, 0.809. Finally the upshift to the third speed ratio is completed by disengaging the secondary torque delivery path upon moving the selector element 88 of coupler 86 to the neutral position.

In the speed ratio changes described, only speed ratio changes to the second and third forward speed ratios involve transmitting power through the secondary power path, i.e., without interrupting power flow between the engine and the transmission. However, any number of the gear ratio changes could employ the secondary torque delivery path to avoid power interruption, provided a pinion corresponding to each of such speed ratios is supported on layshaft 16 and meshes with the output gear of the corresponding gear ratio. Speed ratio changes to the fourth and fifth speeds involve interrupting power flow from the engine to the transmission by disengaging clutch 22.

An upshift from the third to the fourth forward speed ratio begins with the step of disengaging clutch 22. Clutch 30 is inoperative during engagement of the third and fourth forward gears and reverse gear. Next, the selection element or sleeve of coupler 82 is moved to the right-hand position, thereby driveably connecting layshaft 14 and pinion 44. Finally re-engaging clutch 22 complete the fourth forward speed ratio. The torque delivery path for the fourth speed ratio includes input 10, clutch 22, input 18, pinion 36, gear 38, layshaft 14, coupler 82, pinion 44, gear 46, and output 12. The fourth speed ratio is 1.052. Similarly an upshift from the fourth to the fifth forward speed ratio begins by disengaging clutch 22. Next, the selector element of coupler 82 is moved from the right-hand position to the neutral position, and the selector element of coupler 84 is moved from the neutral position to the left-hand position, thereby driveably connecting layshaft 14 and pinion 48. Re-engaging clutch 22 complete the upshift to the fifth forward speed ratio. The torque delivery path for the fifth forward speed ratio includes input 10, clutch 22, input 18, pinion 36, gear 38, layshaft 14, coupler 84, pinion 48, gear 50, and output 12. The fifth speed ratio is 1.267.

Reverse drive is produced when the selector elements of couplers 70, 82, and 86 are in the neutral position and the selector element of coupler 84 is moved to the right-hand position, thereby driveably connecting pinion 52 and layshaft 14. Reverse idler 54, which is rotatably supported on idler shaft 55, reverses the direction of rotation so that gear 56 and the output 12 turn in the opposite direction of rotation from the direction the forward drive gear ratios. Reapplying clutch 22 completes the reverse drive torque delivery path. The torque delivery path for reverse drive includes input 10, clutch 22 shaft 18, pinion 36, gear 38, layshaft 14, coupler 84, pinion 52, reverse idler 54, gear 56, and output 12. The reverse drive speed ratio is −0.314.

The example set out in FIG. 4 was selected to produce the gear ratios that would result from the transmission embodiment of FIG. 1 and using the gear and pinion sizes of FIG. 2.

The one-way clutch 30 represents a one-way drive connection through which the input is connected to the second layshaft, and may be any of the following: a one-way clutch, a sprag-type one-way clutch, a roller-type one-way clutch, a mechanical diode of the type described in U.S. Pat. Nos. 5,070,978; 5,597,057 and 6,065,576; or a hydraulically actuated friction clutch having an engaged state wherein the second layshaft and input are driveably connected and a disengaged state wherein the second layshaft and input are driveably disconnected.

Referring now to the alternate embodiment of FIG. 5, an input 10' supports and is driveably connected to both a pinion 26' of the second power path, and a pinion 36 of the first power path. Pinion 26' is engaged with gear 28, which is supported on the second layshaft; pinion 36 is engaged with gear 38', which is journalled on the first layshaft 14' and is driveably connected to a clutch 22'. Gear 28 is connected through a one-way drive connection 30, to second layshaft 16.

Preferably clutch 22' is a multiple plate friction clutch, and may have a housing 24' connected to gear 38', and a disc 20' carried on layshaft 14'. The disc moves alternately into frictional engagement with housing 241 to connect gear 38' and layshaft 14' when the clutch is applied, and out of engagement with the housing to disconnect gear 38' and layshaft 14' when the clutch is released.

An ASM transmission operating in accordance with the present invention avoids entirely any interruption of power during gear ratio changes and avoids the inherent shift control difficulties of ASMs. This invention, however, also reduces the magnitude of parasitic losses inherent in the operation of an automatic transmission to a much lower magnitude than the losses associated with a conventional ASM transmission.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

We claim:

1. A method for producing a speed ratio change from an off-going speed ratio to an oncoming speed ratio in a transmission having an input, clutch, primary and secondary layshafts, first and second couplers, and output, the method comprising the steps of:

providing between the input and primary layshaft a primary power path having a first speed ratio;

providing between the input and secondary layshaft a one-way drive secondary power path having a second speed ratio that is equal to or less than the first speed ratio;

changing the state of a first coupler to connect driveably the secondary layshaft and output;

disengaging the clutch;

changing the state of a second coupler to connect driveably the primary layshaft and output at the oncoming speed ratio; and re-engaging the clutch.

2. The method of claim 1 further comprising the step of changing the state of the first coupler to disconnect driveably the secondary layshaft and output.

3. The method of claim 1 wherein the transmission includes a first pinion and first gear associated with the off-going speed ratio, and wherein the step of changing the state of a first coupler further comprises:

connecting the secondary layshaft and output through the first coupler, first pinion and first gear.

4. The method of claim 1 wherein the transmission includes a first pinion and first gear associated with the off-going speed ratio, and wherein the step of disengaging the friction clutch further comprises the step of:

connecting the input and output through the secondary power path, first pinion and first gear.

5. The method of claim 4 wherein the transmission includes a second pinion and second gear associated with the oncoming speed ratio, and wherein the step of changing the state of a second coupler further comprises the step of:

connecting driveably the primary layshaft and output through the second coupler, second pinion and second gear.

6. The method of claim 4 wherein the transmission includes a second pinion and second gear associated with the oncoming speed ratio, and the step of re-engaging the friction clutch further comprises the step of:

connecting the input and output through the primary power path, primary layshaft, second coupler, second pinion and second gear.

7. The method of claim 1 wherein the oncoming speed ratio is greater than the off-going speed ratio.

8. The method of claim 1 wherein the oncoming speed ratio is less than the off-going speed ratio.

9. A method for producing a speed ratio change from an off-going speed ratio to an oncoming speed ratio in a transmission having an input, clutch, primary and secondary layshafts, first and second couplers, first pinion, first gear associated with the off-going speed ratio, second pinion, second gear associated with the oncoming speed ratio, and output, the method comprising the steps of:

providing between the input and primary layshaft a primary power path having a first speed ratio;

providing between the input and secondary layshaft a one-way drive secondary power path having a second speed ratio that is equal to or less than the first speed ratio;

changing the state of a first coupler to connect driveably the secondary layshaft and output through the first coupler, first pinion and first gear;

disengaging the clutch to connect the input and output through the secondary power path, first pinion and first gear;

changing the state of a second coupler to connect driveably the primary layshaft and output through the second coupler, second pinion and second gear; and re-engaging the clutch to connect the input and output through the primary power path, primary layshaft, second coupler, second pinion and second gear.

10. The method of claim 9 further comprising the step of changing the state of the first coupler to disconnect driveably the secondary layshaft and output.

11. In a power transmission having an input, a friction clutch, primary and secondary power paths, and output, a method for producing a speed ratio change from an off-going speed ratio to an on-coming speed ratio, comprising the steps of:

establishing a potential drive connection between the input and output through the secondary power path;

disengaging the clutch;

driveably connecting the input and output through the secondary power path at a speed ratio that is equal to or less than the speed ratio produced by the off-going speed ratio through the primary power path;

establishing a potential drive connection between the input and output through the primary power path in the oncoming speed ratio; and re-engaging the clutch.

12. The method of claim 11, further comprising disestablishing the potential drive connection between the input and output through the secondary power path.

13. The method of claim 11 wherein the oncoming speed ratio is greater than the off-going speed ratio.

14. The method of claim 11 wherein the oncoming speed ratio is less than the off-going speed ratio.

15. A method for producing a speed ratio change from an off-going speed ratio to an oncoming speed ratio in a transmission having an input, clutch, primary and secondary layshafts, first and second couplers, and output, the method comprising the steps of:

providing between the input and primary layshaft a primary power path having a first speed ratio;

providing between the input and secondary layshaft a one-way drive secondary power path having a second speed ratio that is equal to or less than the first speed ratio;

changing the state of a first coupler to connect driveably the secondary layshaft and output;

disengaging the clutch;

changing the state of a second coupler to disconnect the primary layshaft and output;

changing the state of a third coupler to connect driveably the primary layshaft and output at the oncoming speed ratio; and re-engaging the clutch.

16. The method of claim 15 further comprising the step of changing the state of the first coupler to disconnect driveably the secondary layshaft and output.

17. The method of claim 15 wherein the transmission includes a first pinion and first gear associated with the off-going speed ratio, and wherein the step of changing the state of a first coupler further comprises:

connecting the secondary layshaft and output through the first coupler, first pinion and first gear.

18. The method of claim 17 wherein the transmission includes a second pinion associated with the off-going speed ratio, and wherein the step of changing the state of a second coupler further comprises the step of:

connecting driveably the primary layshaft and output through the second coupler, second pinion and first gear.

19. The method of claim 18 wherein the transmission includes a third pinion and second gear associated with the oncoming speed ratio, and wherein the step of changing the state of a third coupler further comprises the step of:

connecting driveably the primary layshaft and output through the third coupler, third pinion and second gear.

20. The method of claim 18 wherein the transmission includes a third pinion and second gear associated with the oncoming speed ratio, and the step of re-engaging the friction clutch further comprises the step of:

connecting the input and output through the primary power path, primary layshaft, third coupler, third pinion and second gear.

21. The method of claim 15 wherein the transmission includes a first pinion and first gear associated with the off-going speed ratio, and wherein the step of disengaging the friction clutch further comprises the step of:

connecting the input and output through the secondary power path, first pinion and first gear.

22. The method of claim 15 wherein the oncoming speed ratio is greater than the off-going speed ratio.

23. The method of claim 15 wherein the oncoming speed ratio is less than the off-going speed ratio.

* * * * *